Jan. 13, 1953 W. E. BRILL 2,625,145
POWER PLANT
Filed Nov. 20, 1948 10 Sheets-Sheet 1

Inventor
William E. Brill
By
Spencer, Willits, Helmig & Baillio
Attorneys

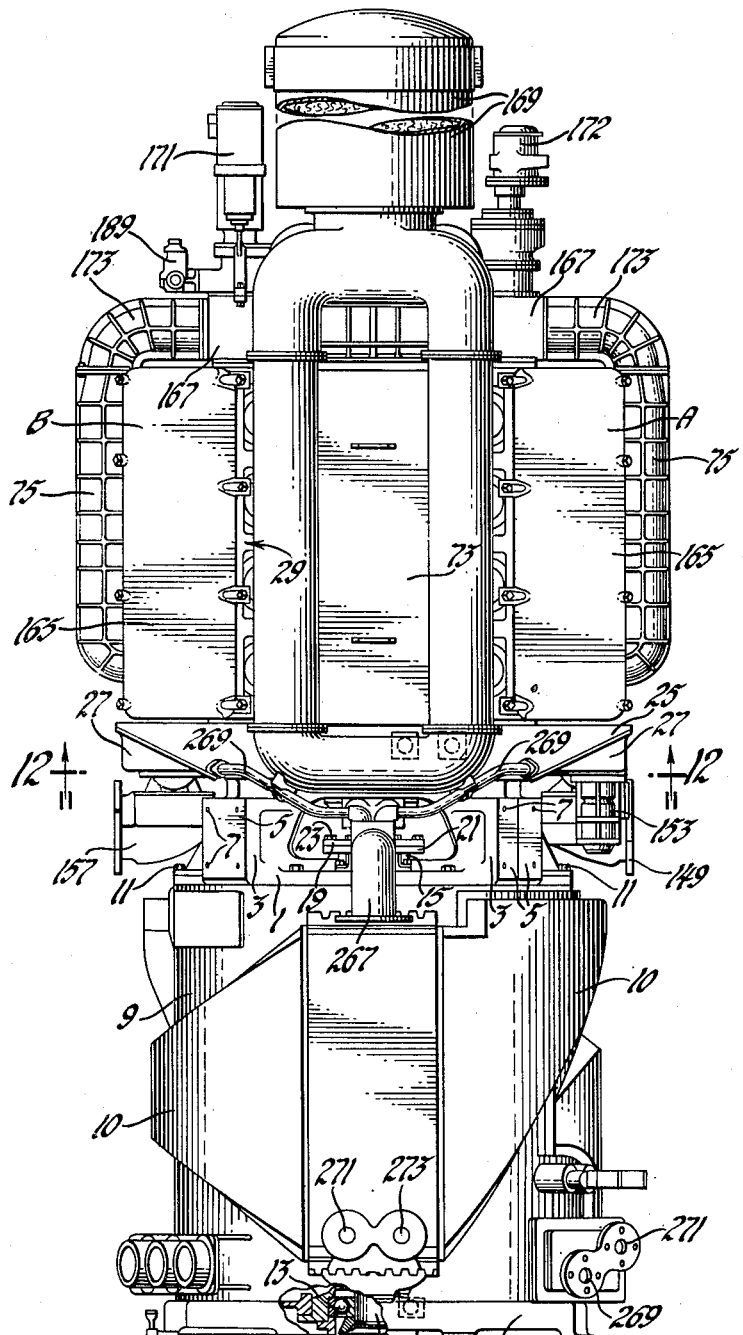

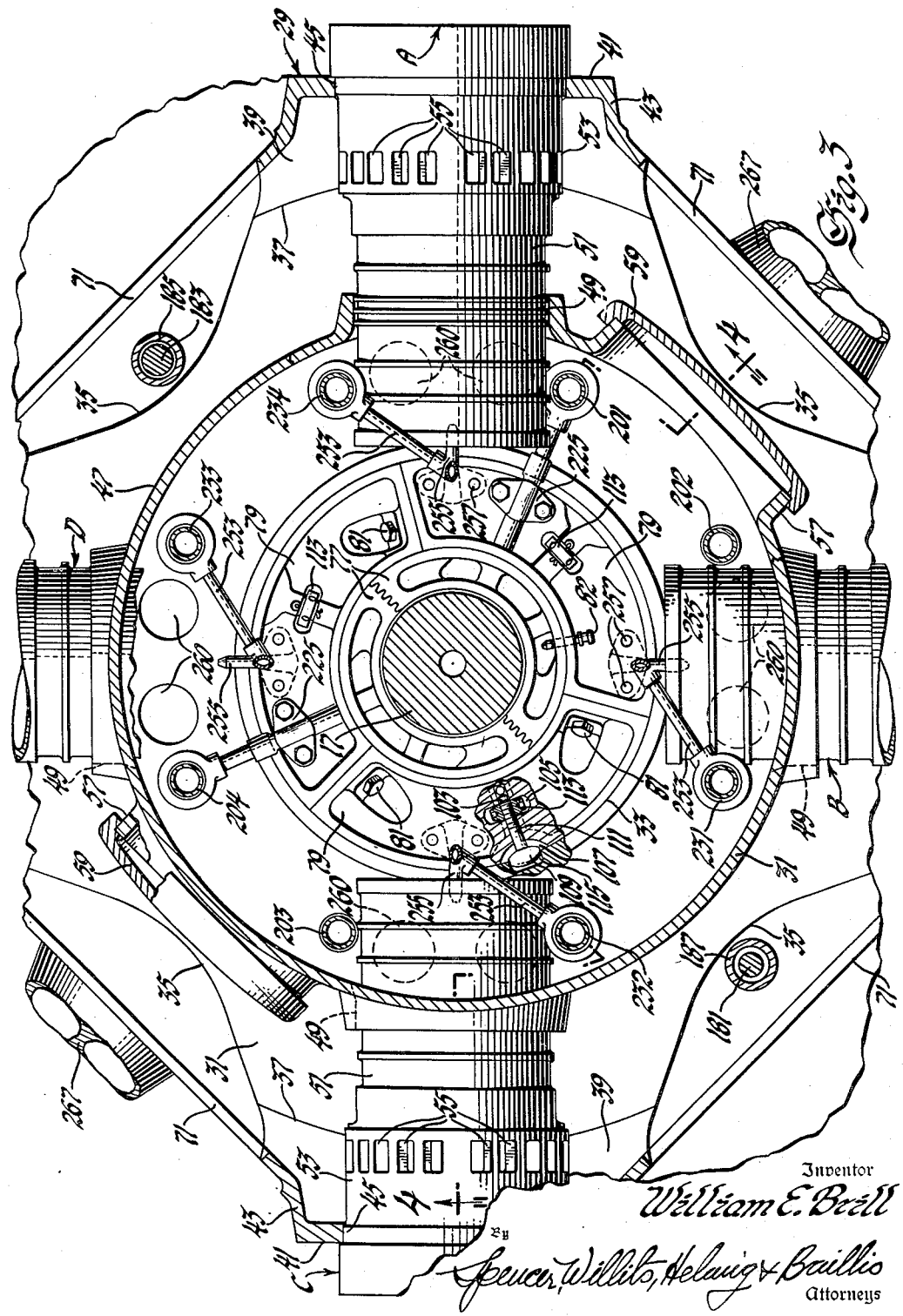

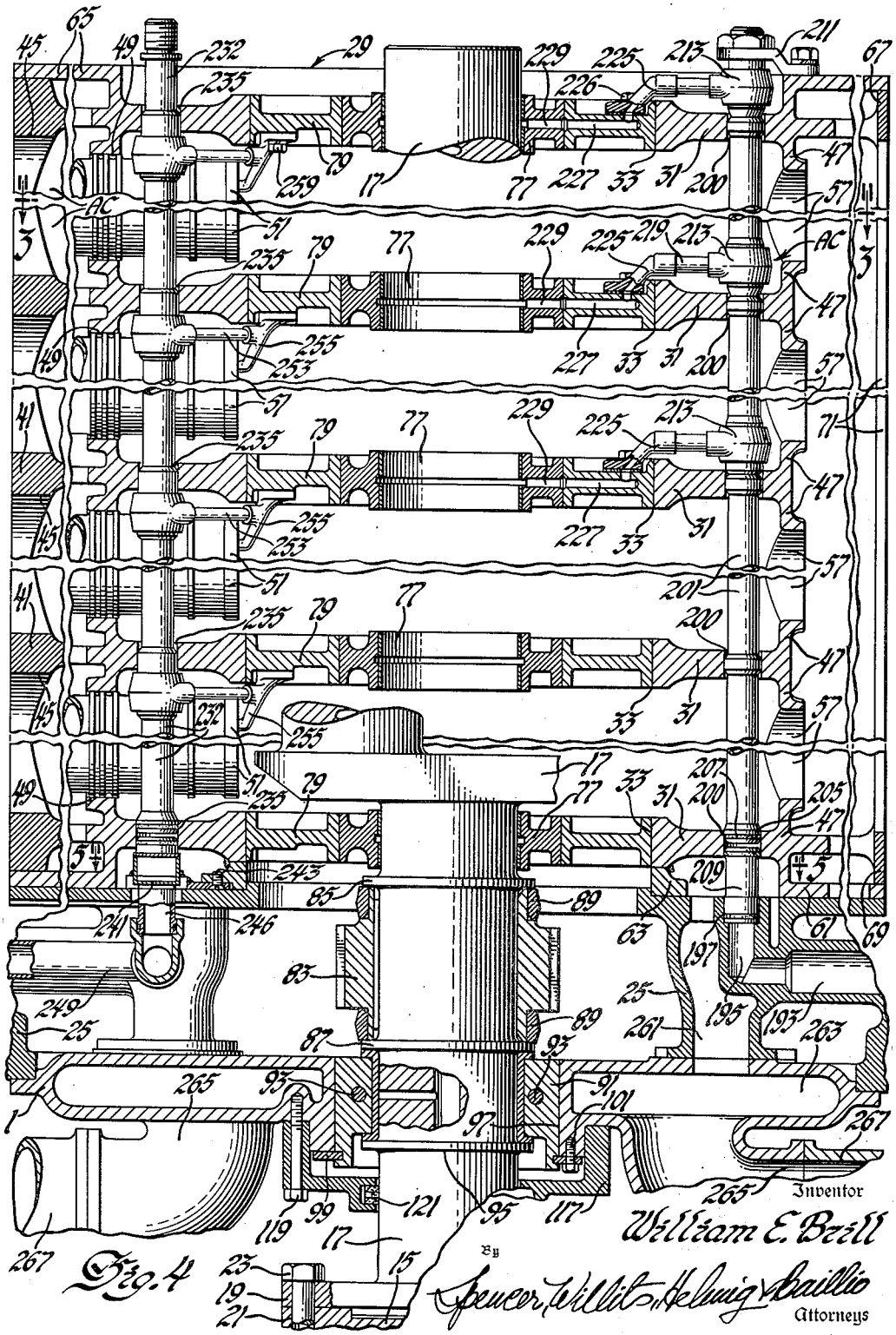

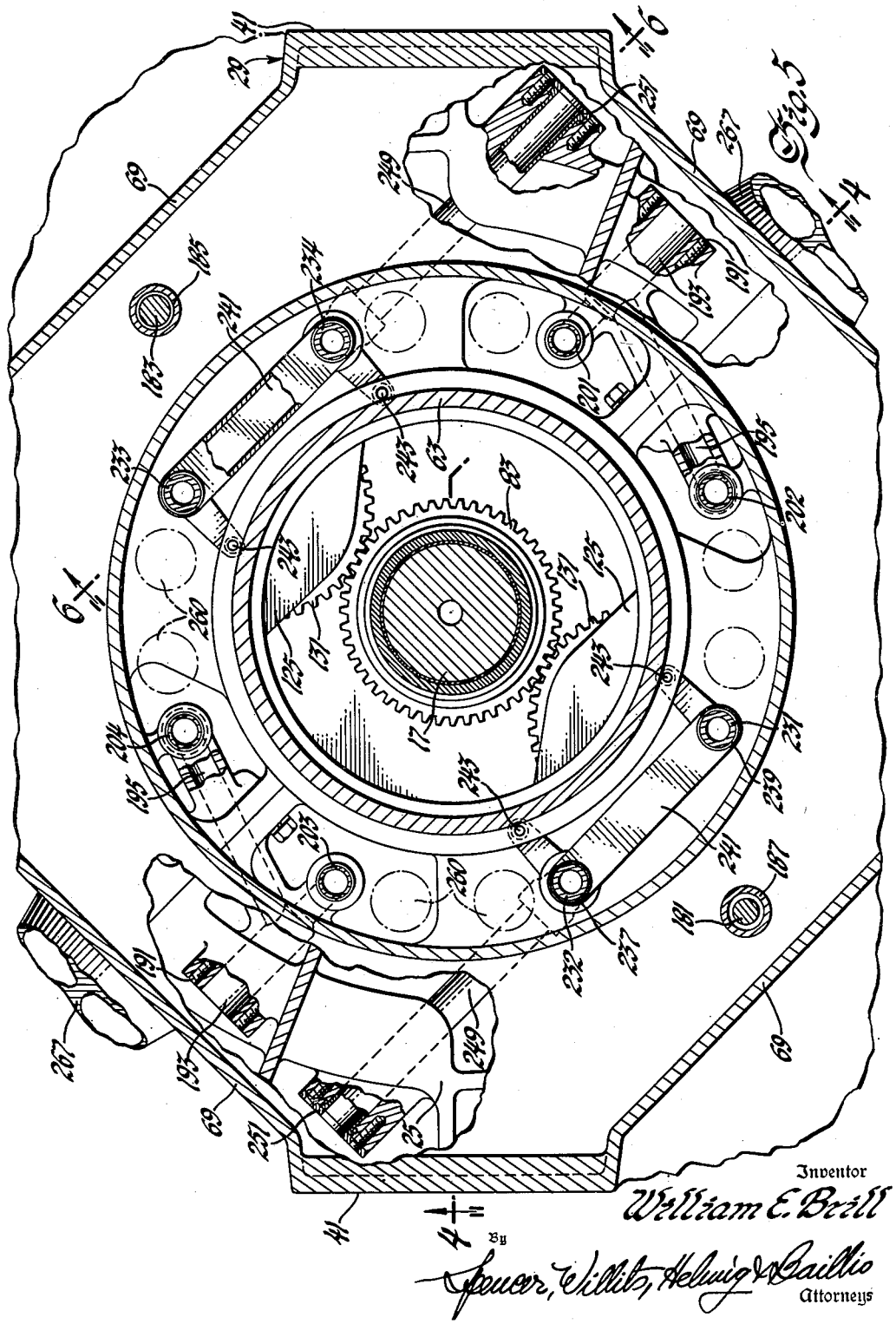

Jan. 13, 1953 W. E. BRILL 2,625,145
POWER PLANT
Filed Nov. 20, 1948 10 Sheets-Sheet 7

Inventor
William E. Brill
By
Spencer, Wellito, Helwig & Caille
Attorneys

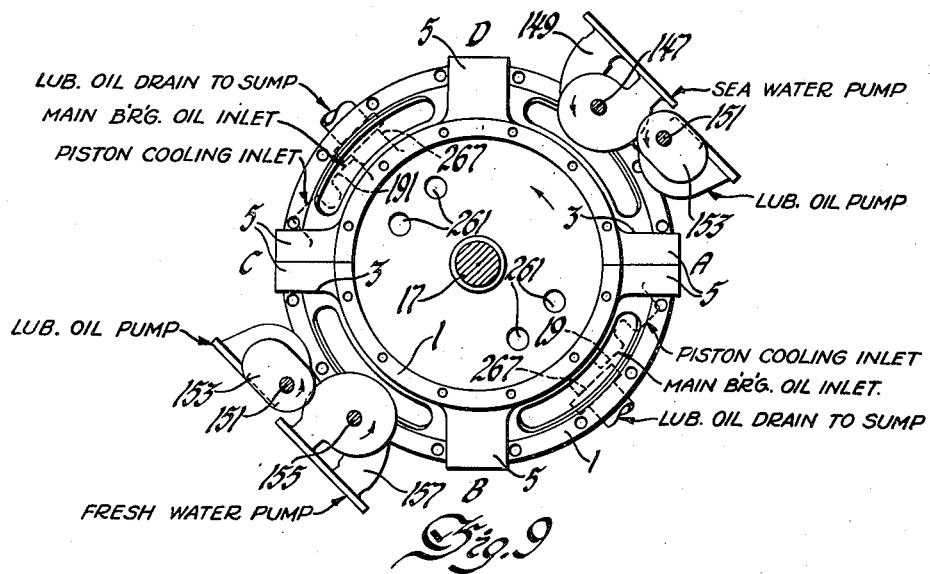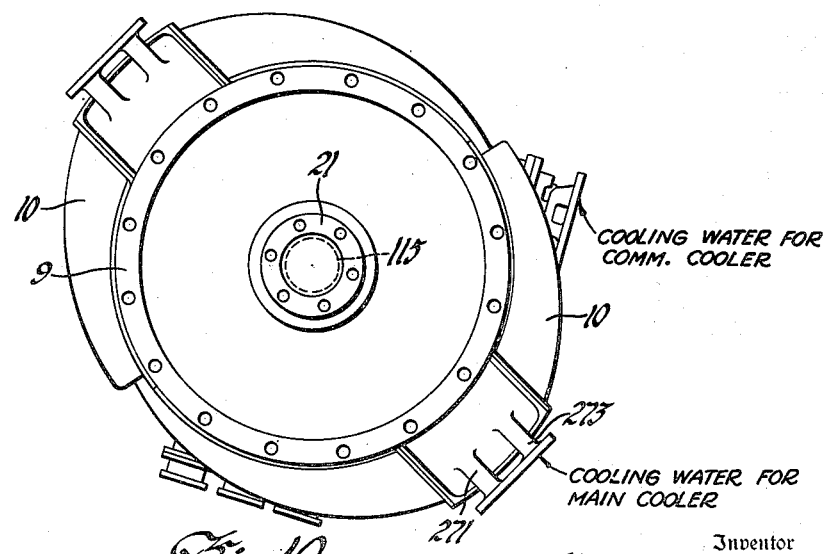

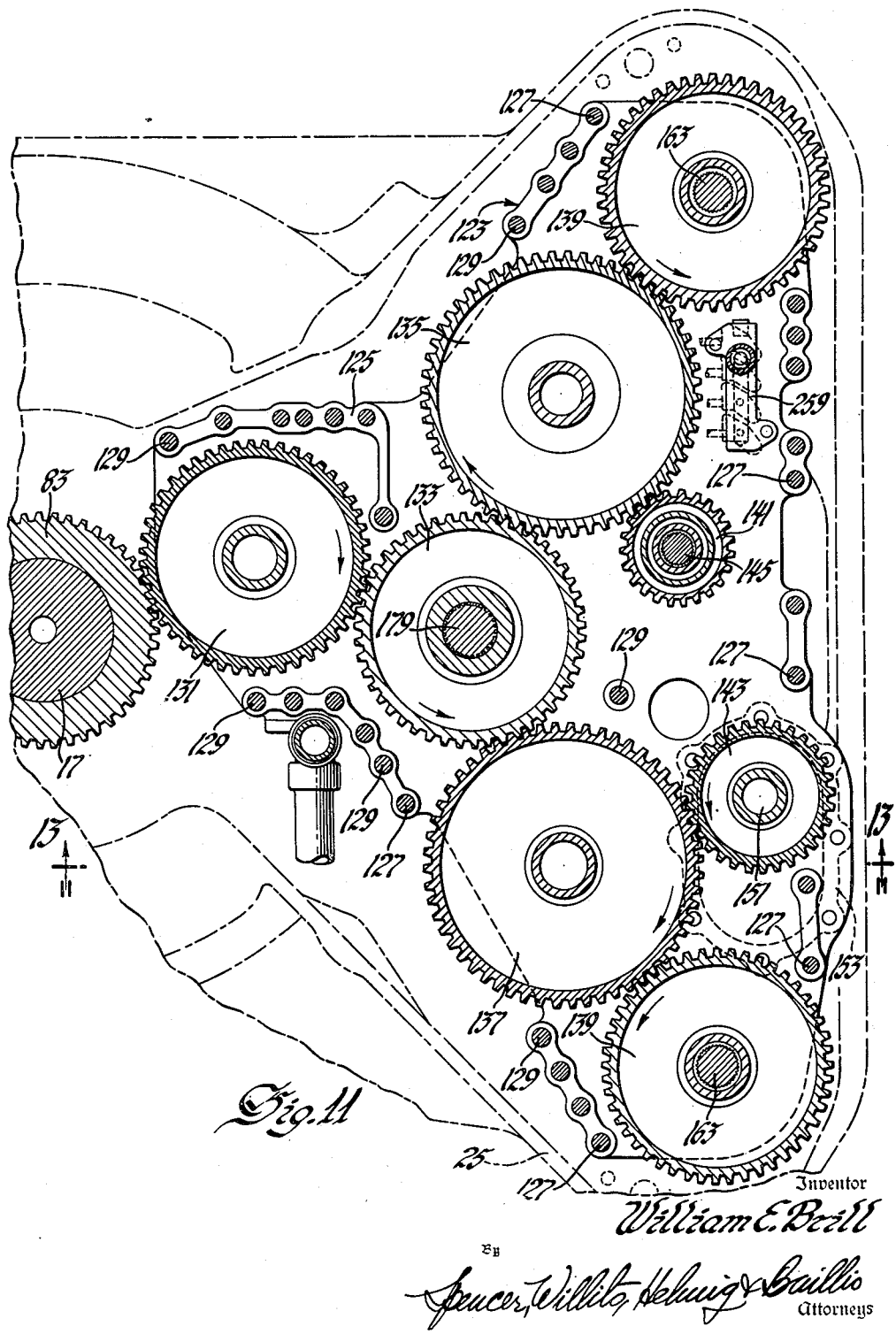

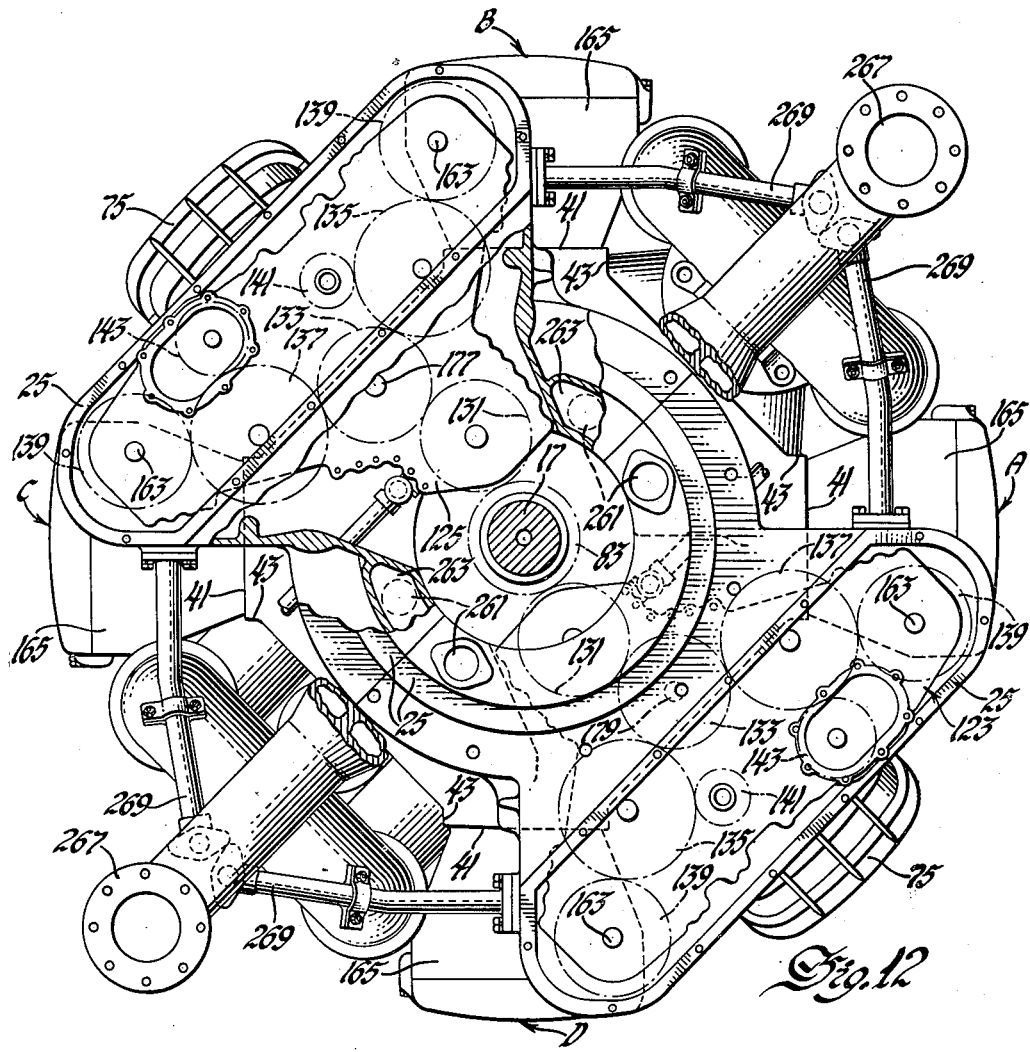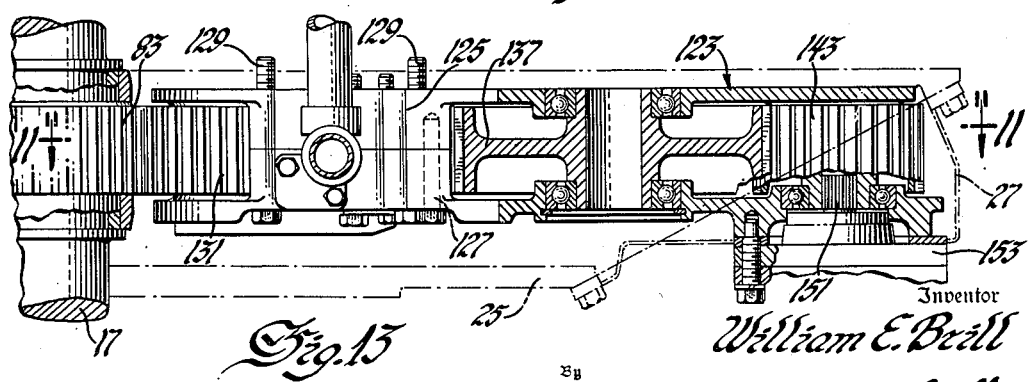

Patented Jan. 13, 1953

2,625,145

UNITED STATES PATENT OFFICE 2,625,145

POWER PLANT

William Elmer Brill, Cleveland, Ohio, assignor to General Motors Corporation, Detroit, Mich., a corporation of Delaware Application November 20, 1948, Serial No. 61,258

15 Claims. (Cl. 123—195)

This invention relates to power plants and more particularly to generating electric power plants including a diesel engine and an electric generator driven thereby.

An object of the invention is to provide a lightweight marine power plant including a high speed diesel engine directly connected to an electric generator forming a compact unit provided with a common central horizontal mounting ring for the engine and generator units and concentric to the coupling between the engine crank and generator shafts rotatable about a vertical axis so that minimum deck space is required for the power plant whereby it may be located in a confined space.

Another object is to provide a fabricated lightweight, rigid engine frame construction having removable cover plates by which the internal parts of the engine may be readily inspected, removed and replaced even in a confined space in which the power plant is mounted.

The construction by which these objects are accomplished together with other advantages provided thereby will become apparent by reference to the detailed description of and drawings illustrating the novel features of the power plant.

Figure 1 of the drawings is a top plan view of the power plant.

Figure 2 is a vertical elevation view of the power plant with parts broken away and in section.

Figure 3 is a horizontal sectional view taken on line 3—3 of Figure 4 with parts broken away and in section.

Figure 4 is a vertical sectional view taken on lines 4—4 of Figure 3.

Figure 5 is a horizontal sectional view taken on lines 5—5 of Figure 4 with parts broken away and in section.

Figure 9 is a top plan view of the power plant mounting ring with adjacent accessories shown in position.

Figure 10 is a top plan view of the generator.

Figure 11 is an enlarged horizontal sectional view taken on line 11—11 of Figure 13.

Figure 12 is a horizontal bottom sectional view taken on line 12—12 of Figure 2.

Figure 13 is an enlarged vertical sectional view taken on line 13—13 of Figure 11.

Figure 2A:
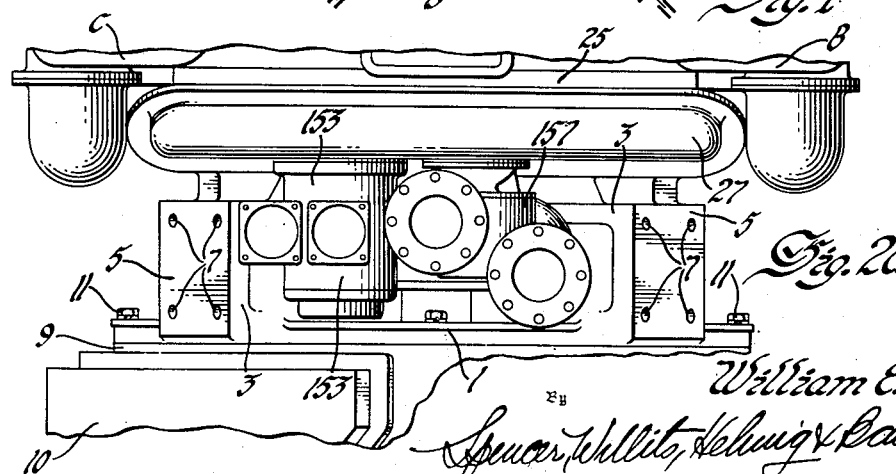
Figure 2a is a vertical elevation view of the central portion of the power plant looking in the direction of the arrows 2a in Figure 2 with parts of the engine and generator broken away.
Figure 8:
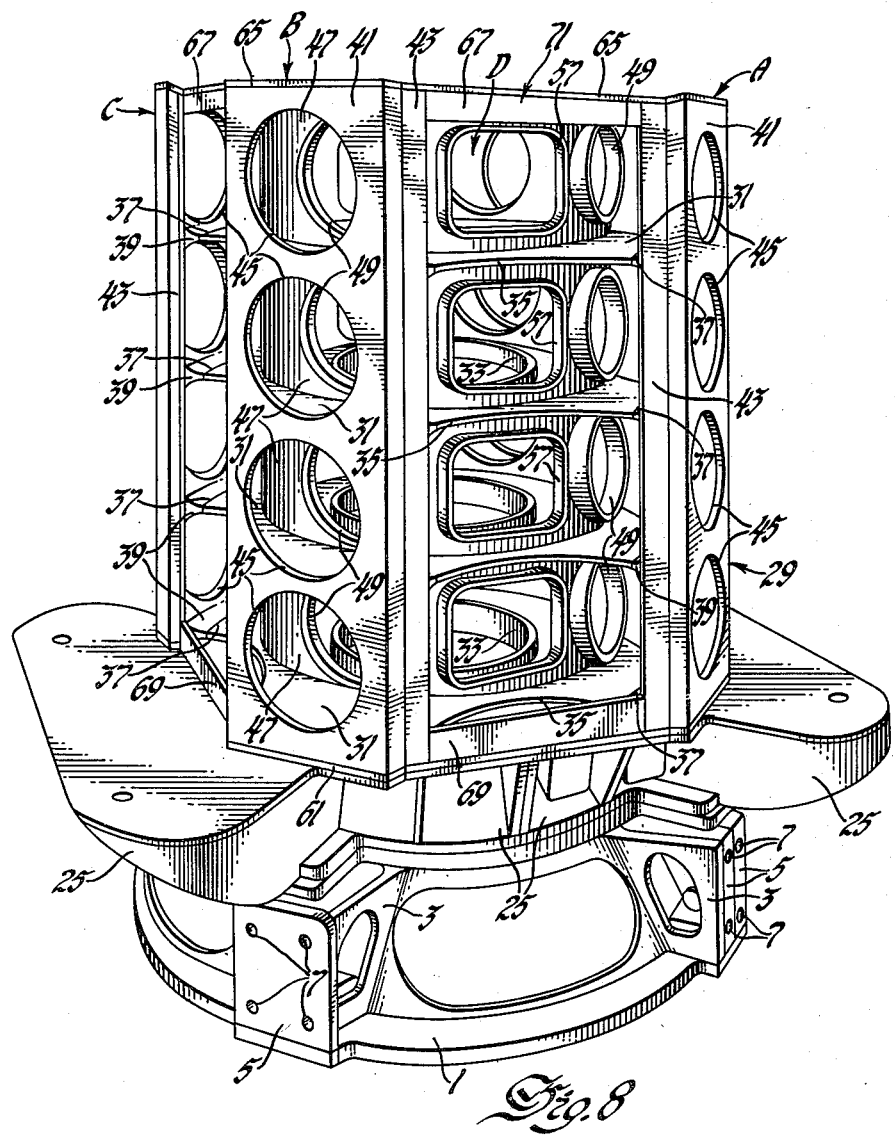
Figure 8 is a perspective view of the engine frame and power plant mounting ring.

The complete power plant unit, as best illustrated in Figure 2, comprises a split horizontal mounting ring 1 having four equally spaced outwardly projecting mounting lugs 3 provided with vertical faces 5 having tapped holes 7 therein for mounting studs or bolts, as best illustrated in Figure 8. The generator stator 9 has attached intercoolers 10 attached thereto through which cooling water is circulated. The stator 9 is secured to the lower flange of the mounting ring 1 by studs 11. A self-aligning antifriction thrust bearing 13 is supported in the lower end of the lower cover plate 14 of the stator 9 for rotatably supporting the lower end of the generator armature shaft 15 and for also taking the entire thrust load of the armature and the engine crankshaft 17, the lower end driving flange 19 of which is rigidly connected to the upper end driven flange 21 of the generator shaft 15 by studs 23, as best shown in Figures 2 and 4.

A split engine accessory drive gear housing 25 is secured by suitable studs, not shown, to the upper face of the mounting ring 1 as best illustrated in Figures 1, 4, 6, 7, 8 and 12. This housing 25 is provided with removable cover plates 27 at opposite sides so that each of two identical accessory driving gear train assemblies housed therein, to be subsequently described, may be readily removed and installed in opposite sides of this housing.

The engine frame, indicated generally by the character reference 29, and best illustrated in Figures 1 to 8, is composed of forgings and plate members secured together by welding. As shown in Figure 8 the frame 29 includes a plurality of vertically spaced horizontal main bearing support members 31 for the main crankshaft journals and to withstand the inertia and gas loads in the engine. The support members 31 are of generally circular form and are provided with axial aligned bores 33 for the removable main bearing assemblies, to be subsequently described. Four peripheral grooves 35 spaced 90° apart are provided in the support members and the arcuate peripheral portions 37 midway between the grooves 35 are secured by welding in abutting relation to the complementary arcuate end portions of flanges 39 in the plane of the support members 31 and secured to the inner surface of each of four vertical cylinder outer deck members 41 having side flanges 43 and circular bores 45 extending radially therethrough with respect to the axis of the bores 33 in the main bearing support members 31 and midway between these members. Cylindrical spacer members 47, forming cylinder inner deck members, are secured at the ends between adjacent main bearing support members 31 and in concentric relation with the main bearing bores 33 therein. The spacer members 47 have four externally flanged portions provided with radial bores 49 extending therethrough and in radial alignment with the bores 45 in the cylinder outer deck members 41. Cylinder liners 51 having coolant jacket portions 53 supported in the bore 45 in the outer cylinder deck members 41 and skirt portions supported in the bores 49 in the cylindrical inner or spacer members 47 are shown in Figures 3 and 4. The cylinder liners are provided with air inlet charging and scavenging ports 55 extending through the jacket portions within the outer deck members 41. Suitable seals, not shown, are provided between the cylinder liners 51 and the bores 45—49 in the outer and inner deck members 41—47 to prevent air leakage at these points.

It will be evident that the cylindrical spacer or inner deck members 47 define the outer wall of separate crank chambers between adjacent main bearing support members 31. Diametral handholes 57 are provided in the cylindrical spacer members 47 between the bores 49 supporting the cylinder liner skirts to permit installation and removal to the main bearing assemblies, to be described. These handholes 57 are normally covered by removable cover plates 59 to seal each of the separate crank chambers.

The engine frame 29 is provided with a lower end plate 61 having an annular mounting flange 63 secured to the lower main bearing support member as best shown in Figure 4. Studs, not shown, project through the mounting flange 63 and are threaded in holes in the upper annular end face of the accessory driving gear housing 25. The engine frame 29 is also provided with an upper end plate 65 secured to the upper main bearing support member 31.

As best illustrated in Figure 8 upper and lower plates 67 and 69 are secured horizontally between the ends of the adjacent side flanges 43 of the outer cylinder deck members 41 with the outer faces of these plates 67—69 positioned flush with these side flanges 43 and edges of the upper and lower end plates 65—61 of the engine frame to form a sealing flange generally indicated at 71 around the four side openings in the engine frame between the adjacent outer cylinder deck members 41. These four side openings between the four vertical cylinder deck members form four cylinder banks at right angles to each other, generally indicated at A, B, C and D in the various drawings, and including four cylinders per bank. The opposite side openings between cylinder banks A—B and between banks C and D and radially disposed to the diametral handholes 57 in the inner cylinder decks 47 are closed by removable cover plates 73 having studs, not shown, extending therethrough and threaded into the sealing flange 71 around these openings as best seen in Figures 4 and 8. The other opposite side openings between the cylinder banks B—C and between D—A are closed by engine driven blowers 75 removably secured by bolts, not shown, threaded in the mounting flange around these openings. The blowers 75 are of the Roots type and have discharge passages, not shown, communicating with the space between the outer and inner cylinder deck members 41—47 and the main bearing support members 31. The spaces between the adjacent main bearing support members 31 and inner and outer cylinder decks 47—41 are placed in communication by the peripheral grooves 35 in these support members 31. These communicating spaces are accordingly provided with air under pressure from the engine driven blowers 75 and serve as an air pressure chamber, generally indicated at AC in Figures 2 and 4 from which air under pressure is supplied through the communicating charging and scavenging air inlet ports 55 into sixteen cylinder liners 51.

The above described engine frame 29 provides a four row radial engine construction having four radial cylinders per row and arranged in four vertical cylinder banks, indicated A—B—C—D in certain figures of the drawings, each bank accordingly having four cylinders.

The crankshaft 17 complete with five identical main bearing assemblies and an auxiliary bearing assembly may be lowered into the above described engine and generator frame assembly. Each main bearing assembly, as best illustrated in Figure 3, comprises split annular main bearings 77 having radial bosses, with bearing material on the internal cylindrical surfaces and both halves are provided with teeth formed along the split line which are held in tight engagement by bolts, not shown, and also by three main bearing adapters 79 of segmental form, the inner cylindrical surfaces of which are drawn into firm engagement with the outer cylindrical surface of the split main bearings 77 by studs 81, shown extending through an opening of an end flange of one adapter and threaded into the adjacent end of another. A pin 82 having a head is inserted through radially aligned openings in the engaging flanges of one adapter and one part of the main bearing and is locked therein by a cotter key to prevent relative rotation therebetween. When the adapters 79 are so engaged with each of the split main bearings 77 the crankshaft main bearing journals are freely rotatable in these bearings and as the outer diameter of the adapter assemblies is slightly less than the bores 33 in the main bearing support members 31 they are axially insertable therein for limited self-aligning axial and radial movement in the bores 33.

A split accessory driving gear 83 is secured between spaced flanges 85—87 of the crankshaft below the bottom main bearing assembly by split retaining rings 89 having suitable studs extending between the ends, not shown, and a split auxiliary bearing 91 is held by studs 93 between the ends of each half on a lower crankshaft journal between the flange 87 and a lower flange 95 as best illustrated in Figure 4. The outer diameter of the auxiliary bearing when so assembled is also slightly less than the central bore 97 in the upper flange of the power plant support ring 1 for downward insertion therein and is nonrotatably and axially positioned in this bore by a split retaining ring 99 insertable radially part way into a circumferential groove having flat bottom portions adjacent the lower end of the auxiliary bearing to permit it to also be slightly self-aligning. Studs 101 extend through openings in the retaining ring and are threaded to the lower face of the upper flange of the support ring. The auxiliary bearing serves as a temporary support for the crankshaft 17 prior to its being secured to the generator armature shaft 15 by the studs 23 extending through the openings in the adjacent flanges 19—21 by these shafts, however, the self-aligning antifriction thrust bearing 13 at the lower end of the armature shaft 15 as previously described when adjustably secured by means of suitable shims in the lower end cover plate 14 of the generator normally takes the entire thrust load of the engine crank and armature shafts and there is no contact between the end faces of the main and auxiliary bearings and the adjacent crankshaft flanges and fillet portions of the crankshaft journals. As best illustrated in Figures 3 and 4, each main bearing assembly is supported for limited self-aligning movement with respect to each of the main bearing bores 33 midway between the fillets of each main bearing journal of the crankshaft 17 in the following manner. Each segmental bearing adapter 79 is provided with a drilled hole 103 extending radially inwardly therethrough and through a slot 105 extending axially through the adapter. A recess 107 is provided in the outer end of each radial hole 103 in which the barrel shaped head 109 of a stud 111 is retained by a nut 113 in the axial slot 105 and threaded on the stud to permit the main bearing assemblies to pass downwardly through the bearing bores 33 and enter a respective bore.

Three recesses 115 are provided in the surface of each bore 33 and the barrel shaped head 109 of each stud 111 is moved by the nut 113 thereon radially outwardly of the recess 107 in the adapter 79 and part way into the recess 115 in the surface of the bore 33 to allow only a slight angular and axial movement of the main bearing assembly with respect thereto and to also allow slight radial movement in the larger diameter bore 33 so that each bearing assembly is self-aligning therein. The stud adjusting nuts 113 are accessible through the handholes 57 in the lower cylinder decks 47 and are prevented from turning relative to the adapters 79 by cotter keys shown extending axially through openings in the nuts. The studs 81 for drawing the adapters 79 into engagement with the main bearings 77 are likewise accessible through these handholes 57 and the adapters and main bearing adapters and bearings may be readily removed and replaced through these holes.

A split seal housing 117, as best shown in Figure 4, surrounds the lower end of the crankshaft 17 projecting through the mounting ring and is secured by studs 119 thereto. The seal housing is provided with an internal slot in which a packing 121 is placed which engages the crankshaft periphery to prevent leakage of engine oil down the shaft.

As best illustrated in Figures 4, 11, 12 and 13 the accessory driving gear 83 on the crankshaft serves to drive two identical accessory driving gear train assemblies, indicated generally by the character reference 123. These assemblies are removably secured in the split driving gear housing 25 through the openings in opposite sides thereof normally closed by the removable cover plates 27.

Each of these gear train assemblies, as best shown in Figures 11, 12 and 13, comprises a horizontally split gear case 125 secured together by studs 127 and having gears rotatably mounted in antifriction bearings supported therein. These assemblies are secured by studs 129 to the upper flange of the housing 25. When so mounted an idler gear 131 of each train meshes with the crankshaft gear 83, as best illustrated in Figure 11. The idler gear 131 also meshes with a governor driving or starter driven gear 133 having an internally splined hub shown meshing with two other idler gears 135—137. The idler gear 135 meshes with a camshaft driving gear 139 having an internally splined hub and a smaller blower and pump driving gear 141 also having a splined hub. The other idler gear 137 meshes with another camshaft driving gear 139 and a pump driving gear 143 each having internally splined hubs.

As best illustrated in Figures 9, 11, 12 and 13, the lower splined end 145 of the driving shaft of the blower 75 and the upper splined end 147 of a sea water pump 149 secured to split gear housing 25 and its cover plate 27 between the cylinder banks A and D are engaged in the internally splined hub of one of the blower and pump driving gears 141. The upper splined end 151 of each of two identical combined main bearing and piston cooling and accessory lubricating pumps 153 secured to each of the cover plates 27 of the split housing 25 between cylinder banks A and D and between B and C is engaged with the internally splined hub of one of the pump driving gears 143. The lower splined end 145 of the other blower driving shaft and the upper splined end 155 of a fresh water engine and generator coolant pump 157, secured to the housing 25 and its cover plate 27 between cylinder banks B and C are engaged in the internally splined hub of the other blower and pump driving gear 141. Each of the lower splined ends 163 of the four engine camshafts are engaged in the splined hub portion of one of the four camshaft driving gears 139. The upper portion of the camshafts, not shown, are rotatably supported in suitable bearings in separate cylinder head covers 165 secured by suitable hold-down bolts, not shown, to each of the outer cylinder deck members 41 and enclosing cylinder head members, not shown, also secured to these deck members by other suitable hold-down bolts, not shown.

Figure 1:
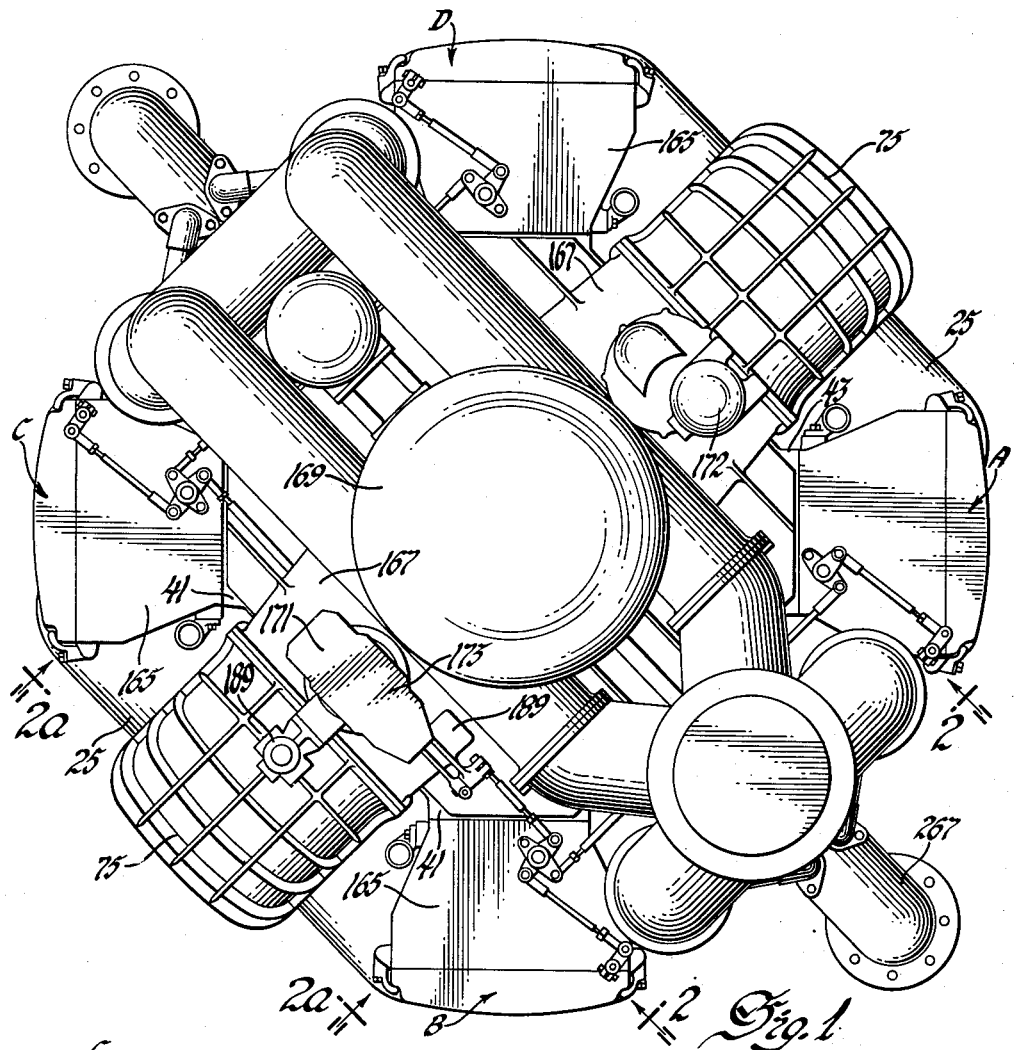

An upper air inlet manifold 167 having combined air inlet silencer and filter 169, an engine governor 171 and starting motor 172 secured thereto is secured to the upper end plate 65 of the engine frame 29. The inlet portion 173 of each of the blowers 75 is shown communicating with the air inlet manifold 167. The engine governor 171 and starting motor 172 are driven by a vertical shaft having a splined lower end portion engaged in the splined hub of one of the driving gears 133. The lower splined end of the governor shaft is indicated by the character reference 177 in Figures 11 and 12 and the lower splined end of the starting motor shaft is indicated by the character reference 179 in Figure 11. The intermediate portion of the governor and starter shafts 181—183 are shown in Figures 3 and 5 enclosed in separate tubes 185—187 pressed in openings in the upper and lower end plates 65—61 in the engine frame and extending vertically through diametrical opposite peripheral grooves 35 in the main bearing members 31 in the air chamber AC of the engine frame 29. An engine fuel pump 189 is shown in Figures 1 and 2 secured to the governor and operatively connected in any suitable manner to the governor shaft 181.

Figure 6:
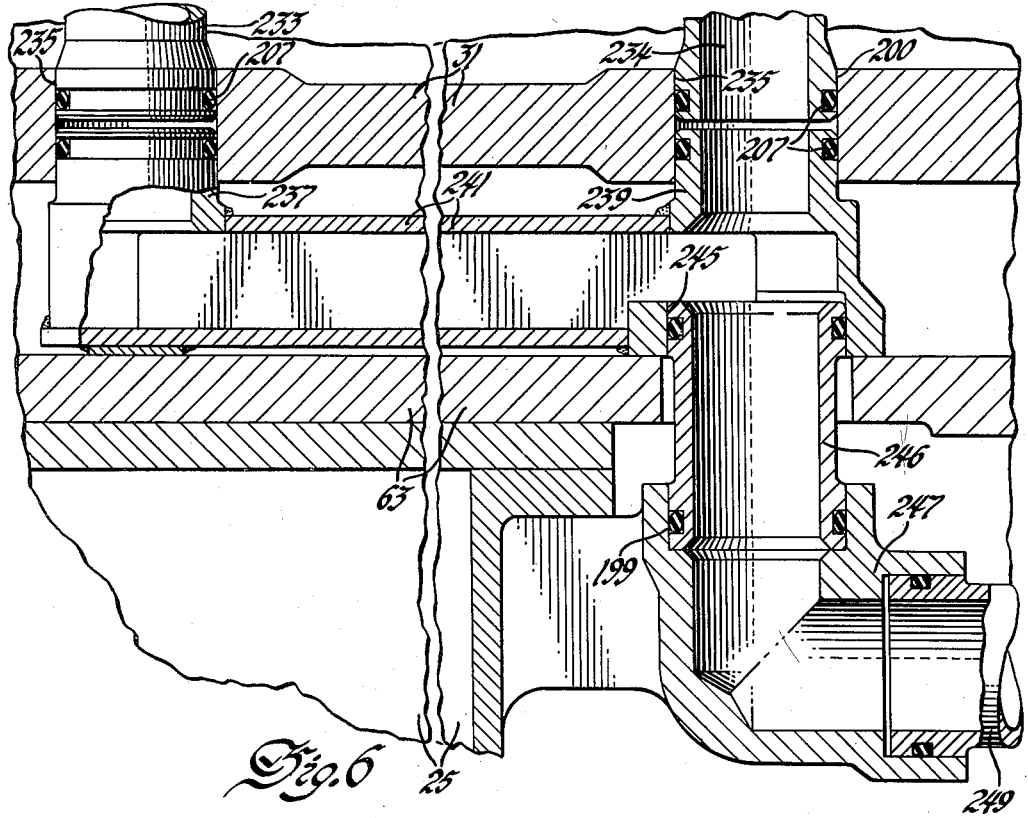
Figure 6 is an enlarged vertical sectional view taken on line 6—6 of Figure 5 with parts broken away and in section.
Figure 7:
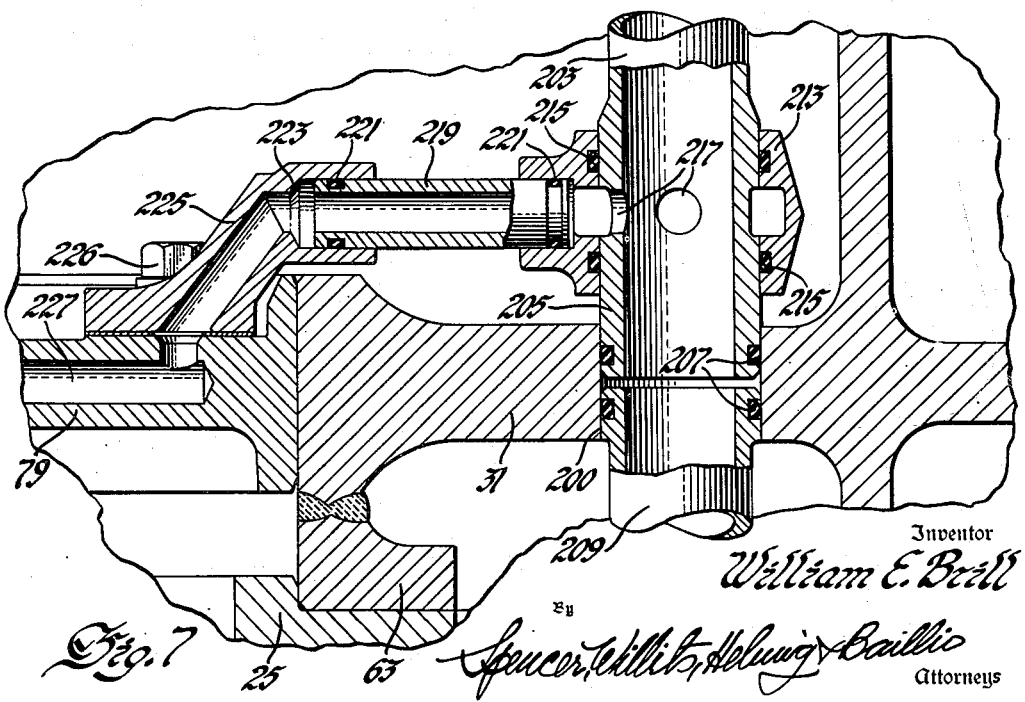
Figure 7 is an enlarged vertical sectional view of certain parts shown in Figure 4.

As best illustrated in Figures 4, 5, 6 and 7 one of the pressure outlet flanges of each of the piston cooling and lubricating pumps 153 is secured by suitable pipe connections and studs to separate flanges 191 on opposite sides of the split mounting ring 1. A pair of cored passages 193—195 lead from the opening in the flange 191 and upwardly facing outlet bores 197—199 lead from each of these passages in vertical alignment with each of four sets of vertically aligned openings 200 in the main bearing support members 31 adjacent the main bearing bores 33 therein as best shown in Figures 4 and 7. Each of four main bearing lubricating manifolds 201—202—203—204 of tubular form and having external flanges are slidable downwardly into separate of these aligned openings 200 in the main bearing support members 31. The lower end flange 205 of each of the main bearing manifolds is provided with an annular groove in which a flexible sealing ring 207 of O form is placed which engages the inner surface of one of the openings 200 in the lower main bearing support member 31 as best shown in Figure 7. A tubular coupling 209 having annular grooves at the ends in which identical flexible O rings 207 are placed engage the inner wall of each of the openings 200 in the lower main bearing support member 31 and the inner wall of one of the adjacent aligned outlet bores 197 or 199 in the mounting ring 1 for connecting each of the manifolds 201—202—203—204 with the outlet of one of the lubricating pumps 153. Each of the above manifolds are secured in the engine frame by means of clamping means, indicated generally at 211 in Figure 4, and secured between the upper closed end of each manifold and the upper plate 65 of the engine frame. As best illustrated in Figures 4 and 7 a plurality of hollow T fittings 213 are positioned on each of the main bearing manifolds 201—202—203—204 adjacent certain of the main bearing support members 31 and in sealing relation with the outer wall of each of these manifolds by means of flexible sealing rings 215 of O form in internal annular grooves therein either side of a radial outlet hole 217 in the manifold wall. A tubular coupling 219 having flexible sealing O rings 221 in annular external grooves at the ends engage the internal wall of the side outlet of one of the T fittings 213 and the internal wall of a passage 223 in a lubricating fitting 225 secured by means of a stud and gasket to one of the segmental main bearing adapters 79. Certain of these adapters 79 are provided with a radial lubricating passage 227 shown in communication with the passage 223 in the fitting 225 secured thereto. The radial passage 227 in two adapters registers with radial passages 229 in each part of the split main bearing 77 as best shown in Figure 4 for applying lubricant under pressure to the crankshaft main bearing journal.

Lubricant under pressure is supplied through identical connections to the three upper main bearings from the manifolds 201—204 and to the two lower main bearings from the manifolds 202—203. The various flexible O ring seals in each of the above described pressure lubricating connections permits relative self-aligning movement of the main bearings and adapters 77—79 in the engine frame 29 relative to the manifolds 201—202—203—204 therein without leakage of the lubricant from these connections.

Identical piston cooling and accessory lubricating manifolds 231—232—233—234 are slidable into other vertical aligned openings 235 in the main bearing support members 31 and held in the engine frame by identical clamping means 211. Each of the lower flanged ends of the manifolds 231—232—233—234 are also provided with external grooves having O rings 207 engaging the wall of each opening 235 in the lower main bearing support member as best shown in Figure 6. The two upstanding outlet bosses 237—239 of each of two manifolds 241 secured by studs 243 to the lower plate member 63, as shown in Figure 4, are also provided with grooved upper ends having O rings 207 engageable with the wall of each opening 235. The wall of the lower inlet opening 245 of each manifold 241 is connected by a tubular coupling 246 with an elbow fitting 247 secured to each half of the split accessory gear cases 25, as best illustrated in Figures 6, 11 and 12. The elbow 247 is connected by means of a coupling 249 with an opening in one of two flanges 251 on either side of the split gear case 25 to which the other pressure outlet of a respective piston cooling and lubricating pump 153 is attached by suitable pipe connections and studs. Suitable O rings are shown provided between the couplings 246—249, and the elbow 247 and inlet opening 245 of each manifold 241.

Four T fittings 213 are also placed in identical sealing relation with holes in each of the manifolds 231—232—233—234 and couplings 253 similar to the couplings 219 and having O rings at each end which serve to connect the side outlets of the T fittings on these manifolds to nozzles 255 secured on the main bearing adapters by studs 257 so that oil under pressure is directed axially outwardly into each cylinder liner for impinging on the engine pistons, not shown, for cooling and lubricating the pistons, cylinder walls and wrist pins in the pistons. The flexible O rings in the couplings 253 also permit self-aligning action of the main bearings and bearing adapters relative to the engine frame without leakage of the lubricant. Suitable connections, not shown, are also connected between the manifolds 231—232—233—234 to a distribution manifold 259 shown in Figure 11, secured to the split accessory gear housing 123 from which suitable pipes lead to the accessory gears and shafts therefor. Other pipes, not shown, also lead to the camshaft, blower, governor and starting motor shaft bearings.

In order to provide adequate drain openings for the lubricant from the main bearings and piston cooling nozzles which falls by gravity drain openings 260 are provided in each main bearing support member 31 to the bottom plate and upper part of the accessories gear cases. Communicating vertical drain openings 261 are provided in the lower plate and split accessory gear housing and split mounting ring to a cavity 263 in the upper portion of the latter from which two cord outlets 265 lead to which are connected two drain elbows 267 as best shown in Figures 4, 5, 9 and 12. The lubricant falling on the upper portion of the gear cases 123 and that issuing therefrom is led by drain manifolds 269 secured to the accessory gear housing to the drain elbows 267, as best shown in Figures 2 and 12. The drained lubricant is circulated by a scavenging pump, not shown, to lubricant cooling and filtering mechanism, not shown, to which the inlets of the two combined lubricating and piston cooling and accessory lubricating pumps are connected by suitable connections, not shown.

The fresh water coolant pump 157 circulates fresh water through suitable cooling connections, not shown, and the jacket portions 53 of the cylinder liners 51 and through the inlet and outlet openings 271—273 of the intercoolers 10 of the generator stator 9 and also through an intercooler, not shown, through which sea water is circulated by the sea water pump 149 shown in Figures 1 and 10.

I claim:

1. In a power plant, supporting means having a central opening extending therethrough, an engine supported on one side of said means and having a crankshaft extending therethrough, a housing secured to the other side of said means and having a thrust bearing on which the crankshaft is normally supported for rotation and a combined emergency thrust bearing and oil seal for said crankshaft in the central opening of said supporting means.

2. In a power plant, a horizontal supporting means having a central vertical opening therein, an engine supported on said supporting means and having a vertical driving shaft extending through the opening, a combined emergency thrust bearing and oil seal for said engine driving shaft in the opening of said supporting means, a housing suspended on said supporting means, a thrust bearing in said housing and a driven member operably connected to said driving shaft, said connected driving shaft and driven member being supported for normal rotation by said thrust bearing.

3. In a power plant, supporting means, a housing removably suspended therefrom, said housing having a thrust bearing therein, a driven member supported for rotation about a vertical axis on said thrust bearing, an engine removably mounted on said supporting means having bearing openings in vertical alignment with said thrust bearing, an engine driving shaft having bearings removably attached thereto and insertable in said bearing openings for limited self-aligning movement therein, and a combined emergency thrust bearing and fluid seal on said driving shaft insertable in said supporting means, said driving shaft being directly connected to said driven member for normal support by said thrust bearing.

4. An engine having an enclosed frame including cylinder liner and bearing support members having openings extending therethrough, a crankshaft having a driving gear and bearings removably secured thereon, said bearings being insertable in the openings of said bearing support members for limited self-aligning movement, one of said bearings located at one end of said crankshaft serving as a combined emergency thrust bearing and oil seal, an oil seal secured to the support member outside said combined emergency thrust bearing and oil seal, a driving gear train assembly secured in said enclosed frame and operable by said crankshaft gear, said enclosed frame having an opening adjacent said assembly for removal of said assembly, and a cover for the opening in said enclosed frame.

5. An engine having a frame including vertically spaced bearing supports provided with vertically aligned bearing support openings and means for supporting engine cylinder liners at right angles to the bearing support openings, said bearing supports having oil drain openings and other vertically aligned openings, lubricating and cooling oil supply manifolds in said other aligned openings, a crankshaft having removable main bearings and a combined emergency thrust bearing and oil seal at one end insertable downwardly into said bearing openings for limited self-aligning movement therein, means on said main bearings for directing lubricating and cooling oil to said bearings and at right angles thereto, and articulated oil connections connected between said oil directing means and said lubricating and cooling oil supply manifolds.

6. In an engine, a support ring, a gear housing removably secured to said ring having a bearing opening in one end adjacent the opening in said ring and a side opening adjacent thereto, a removable cover for said side opening, an engine frame having axially spaced main bearing openings in alignment with the bearing opening in said housing and openings extending radially with respect to said main bearing openings, engine cylinder liners supported in certain of the radially extending openings in said frame, and removable bearing access covers for other of the radially extending openings, an engine crankshaft having main bearing members removably secured thereto and insertable into said main bearing openings for limited self-aligning movement, a combined emergency thrust bearing and oil seal removably secured to said crankshaft insertable in the bearing opening in said gear housing, and a driving gear on said crankshaft adjacent said emergency thrust bearing and oil seal and an engine accessory driving train assembly detachably secured in said housing for operation by said crankshaft driving gear and removable through the side opening in said housing.

7. In an engine, an engine support, an engine accessory gear housing removably secured thereto, an engine frame removably secured to said housing, an engine driving shaft rotatably supported in said engine frame and having a driving gear thereon extending into said gear housing, an engine accessory driving gear supporting unit removably secured in said gear housing, a gear train supported in said supporting unit and operable by said driving gear, said housing having an opening through which said gear supporting unit and gear train thereon is removable as a unit, and a cover for said housing opening.

8. In an engine frame, longitudinally spaced main bearing support members, and longitudinally extending deck members spaced apart and connecting said main bearing members to form an engine crank and air chamber, engine cylinder liners supported between said deck members and provided with air inlet ports, said deck members having openings therein to provide access to said crank and air chambers, and removable covers for the openings in said deck members.

9. In an engine frame, longitudinally spaced main bearing support members having aligned circular main bearing openings therein, main bearing members of segmental form insertable separately into the main bearing openings, said segmental main bearing members having clamping means for connecting said segmental members together to form annular main bearing assemblies having less diameter under all engine conditions than said main bearing openings for continuous slight self-aligning movement in said main bearing openings and means for limiting axial and rotary movement of said main bearing assemblies in said openings.

10. In an engine frame, longitudinally spaced main bearing support members having aligned circular main bearing openings therein, main bearing members of segmental form insertable separately into the main bearing openings, said segmental main bearing members having clamping means for connecting said segmental members together to form annular main bearing assemblies of less outside diameter than the said main bearing openings for continuous self-aligning movement in said main bearing openings and means for limiting axial and rotary movement of said main bearing assemblies in said opening, said main bearing assemblies having piston cooling nozzles secured thereto.

11. In an engine frame, vertically spaced main bearing support members having vertically aligned main bearing openings, a hollow inner deck member secured at the ends between adjacent main bearing support members in coaxial relation with the bearing openings therein, said inner deck member having radial openings therein, cylinder liners extending through certain of the deck openings and removable covers for the other deck openings, main bearing assemblies in said main bearing openings of annular form including elements of segmental form having clamping means for the ends, means adjustable thereon for engagement with said bearing support members to limit self-aligning movement of said bearing assemblies in the bearing openings and lubricating and cooling nozzles for directing fluid into said cylinder liners.

12. In an engine frame, vertically spaced main bearing support members having vertically aligned main bearing openings and lubricant openings, tubular lubricant supply manifolds insertable in certain of said lubricant openings, said other lubricant openings serving as drain openings, main bearing assemblies mounted in said bearing openings for limited self-aligning movement and including lubricant passages and lubricant directing nozzles, and lubricant connections including flexible seals for connecting said manifolds to said passages and nozzles of said self-aligning bearing assemblies.

13. In a power plant, a horizontal power plant support ring, a housing secured to the lower side of said ring and including a thrust bearing, and a driven member supported for rotation about a vertical axis therein on the thrust bearing, an engine removably secured to the upper part of said ring and including an engine accessory driving assembly, a crankshaft having bearing assemblies removably secured thereto and insertable vertically as a unit in said engine for rotating about a vertical axis and for direct connection to said driven member and accessory driving assembly, said engine having removable cover plates for removal of said accessory driving and said bearing assemblies.

14. In a power plant, a support, an engine frame removably secured to the upper face of said support and including an outer air chamber and an inner crank chamber and a lower accessory driving gear chamber including a driving gear assembly, oil supply and return passages, and a lower bearing and oil seal opening, a crankshaft having main bearing assemblies removably secured thereon, a combined emergency thrust bearing and seal assembly and an accessory driving gear, said crankshaft and bearing assemblies being insertable vertically as a unit into said crank chamber for limited self-aligning movement for driving said accessory driving gear assembly by means of said crankshaft driving gear, said combined emergency thrust bearing and seal assembly being positioned in the lower opening in said gear chamber, a seal for the lower end of said crankshaft projecting downwardly through the lower opening of said gear chamber, said frame having removable covers for disassembly and removal of said main bearing assemblies and for removal of said accessory driving gear assembly as a unit, a housing including a thrust bearing, a driven member rotatable in said housing and directly connected to the lower end of said engine crankshaft, said housing being removably secured to the lower face of said support ring so that said thrust bearing normally supports said driven member and said crankshaft when said housing is secured to said support ring and means removably securing said seal and said combined emergency thrust bearing and seal assembly in said support ring for self-aligning movement.

15. In a power plant, a power plant support having an opening extending therethrough, an engine frame removably supported on said support and including inner and outer decks supporting engine cylinder liners, covers and blowers secured between said outer decks and covered openings in said inner deck to form an outer cylinder air supply chamber supplied with pressure by said blowers and an inner crank chamber, bearing supports in said crank chamber having vertically spaced main bearing support members and a lower gear housing having side openings and covers for said openings, a lower opening, and oil drain and supply passages therein, said bearing supports having openings aligned with said oil supply passages in said housing and tubular lubricant manifolds insertable in said openings and passages, a crankshaft having main bearing assemblies and an emergency thrust bearing and oil seal assembly removably secured thereto for insertion respectively in said aligned main bearing openings in said engine frame and said opening in said power plant support for limited self-aligning movement therein about a vertical axis, a seal for the lower end of said shaft, means for removably securing said seal and said emergency thrust bearing and seal assembly in the opening in said power plant support, lubricating and cooling pumps supported on said housing, an accessory driving unit assembly operable by said crankshaft and removably secured in said housing adjacent the side openings therein and removable as a unit therethrough, blower, pump and governor shafts and camshafts rotatable in said frame by said driving unit assembly, a second housing removably secured to the lower extremity of said power plant support and having a driven member therein connected directly to the lower end of said crankshaft, said second housing having a thrust bearing normally supporting said connected crankshaft and driven member for rotation about a vertical axis.

WILLIAM ELMER BRILL.

REFERENCES CITED

The following references are of record in the file of this patent:

UNITED STATES PATENTS

| Number | Name | Date |
|---|---|---|
| 1,972,441 | Gosslau | Sept. 4, 1934 |
| 2,065,790 | Braunwalder | Dec. 29, 1936 |
| 2,103,902 | Heintz | Dec. 28, 1937 |
| 2,240,664 | Moore | May 6, 1941 |
| 2,353,231 | Ginn | July 11, 1944 |
| 2,426,879 | Hobbs et al. | Sept. 2, 1947 |
| 2,442,924 | Ginn et al. | June 8, 1948 |

FOREIGN PATENTS

| Number | Country | Date |
|---|---|---|
| 149,875 | Great Britain | Aug. 26, 1920 |